(12) United States Patent
Chien et al.

(10) Patent No.: US 8,453,210 B2
(45) Date of Patent: May 28, 2013

(54) FILE SHARING SYSTEM AND METHOD

(75) Inventors: Chia-Hung Chien, Taipei Hsien (TW);
Chun-Wen Wang, Taipei Hsien (TW);
Chia-Peng Wang, Taipei Hsien (TW);
Ling-Wei Liu, Taipei Hsien (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 846 days.

(21) Appl. No.: 12/579,239

(22) Filed: Oct. 14, 2009

(65) Prior Publication Data

US 2010/0333179 A1    Dec. 30, 2010

(30) Foreign Application Priority Data

Jun. 24, 2009   (CN) .......................... 2009 1 0303576

(51) Int. Cl.
*H04L 29/06*    (2006.01)
(52) U.S. Cl.
USPC ............................................. 726/4

(58) Field of Classification Search
None
See application file for complete search history.

(56) References Cited

U.S. PATENT DOCUMENTS

| | | | |
|---|---|---|---|
| 2004/0225894 A1* | 11/2004 | Colvin | 713/200 |
| 2005/0228753 A1* | 10/2005 | Viger et al. | 705/51 |
| 2007/0101440 A1* | 5/2007 | Bhatia et al. | 726/28 |

\* cited by examiner

*Primary Examiner* — Gilberto Barron, Jr.
*Assistant Examiner* — Malcolm Cribbs
(74) *Attorney, Agent, or Firm* — Altis Law Group, Inc.

(57) ABSTRACT

A file sharing system includes a web server, a first electronic device, and a second electronic device. The web server includes an authorizing module and a server storage module. The server storage module is capable of storing files uploaded from a first electronic device. The authorizing module is capable of recording an authorizing setting from the first electronic device to authorize a second electronic device to access the files in the server storage module.

2 Claims, 3 Drawing Sheets

FILE SHARING SYSTEM AND METHOD

BACKGROUND

1. Technical Field

The present disclosure relates to a file sharing system and method between electronic devices.

2. Description of Related Art

Digital photo frames (DPF) are becoming increasingly popular due to the convenience and ease of manipulation when browsing media files stored therein. When a user of the DPF wants to share a private media file with others, the media file must be uploaded to a remote public server on the Internet for the others to download which is insecure and so creates a risk that others may obtain the file without authorization.

What is needed, therefore, is a file sharing system and method between electronic devices.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
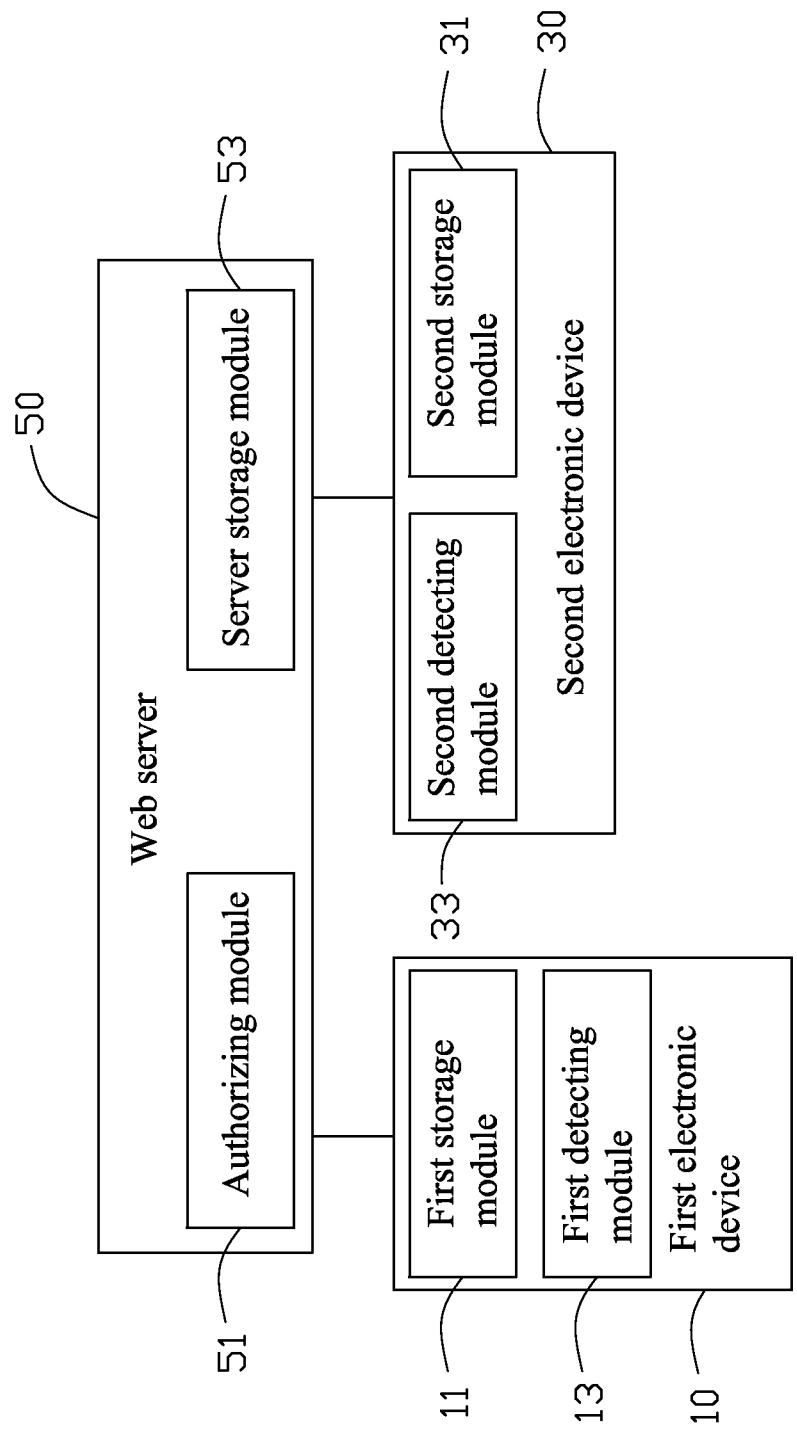
FIG. 1 is a schematic diagram of an embodiment of a file sharing system.

Referring to FIG. 1, a file sharing system includes a web server 50, a first electronic device 10 and a second electronic device 30. The web server 50 includes an authorizing module 51 and a server storage module 53. The web server 50 may be, for example, an intranet server or a server provided by a social communication web site.

The first electronic device 10 and the second electronic device 30 may be connected to the web sever 50 through an intranet or the Internet. At least one of the first electronic device 10 and the second electronic device 30 is an embedded multimedia device, such as a digital photo frame. The first electronic device 10 includes a first storage module 11 and a first detecting module 13. A plurality of files can be stored in the first storage module 11. The files may be phone files, video files, or other multimedia files. The second electronic device 30 includes a second detecting module 33 and a second storage module 31. The first electronic device 10 and the second electronic device 30 have static IP addresses.

Figure 2:
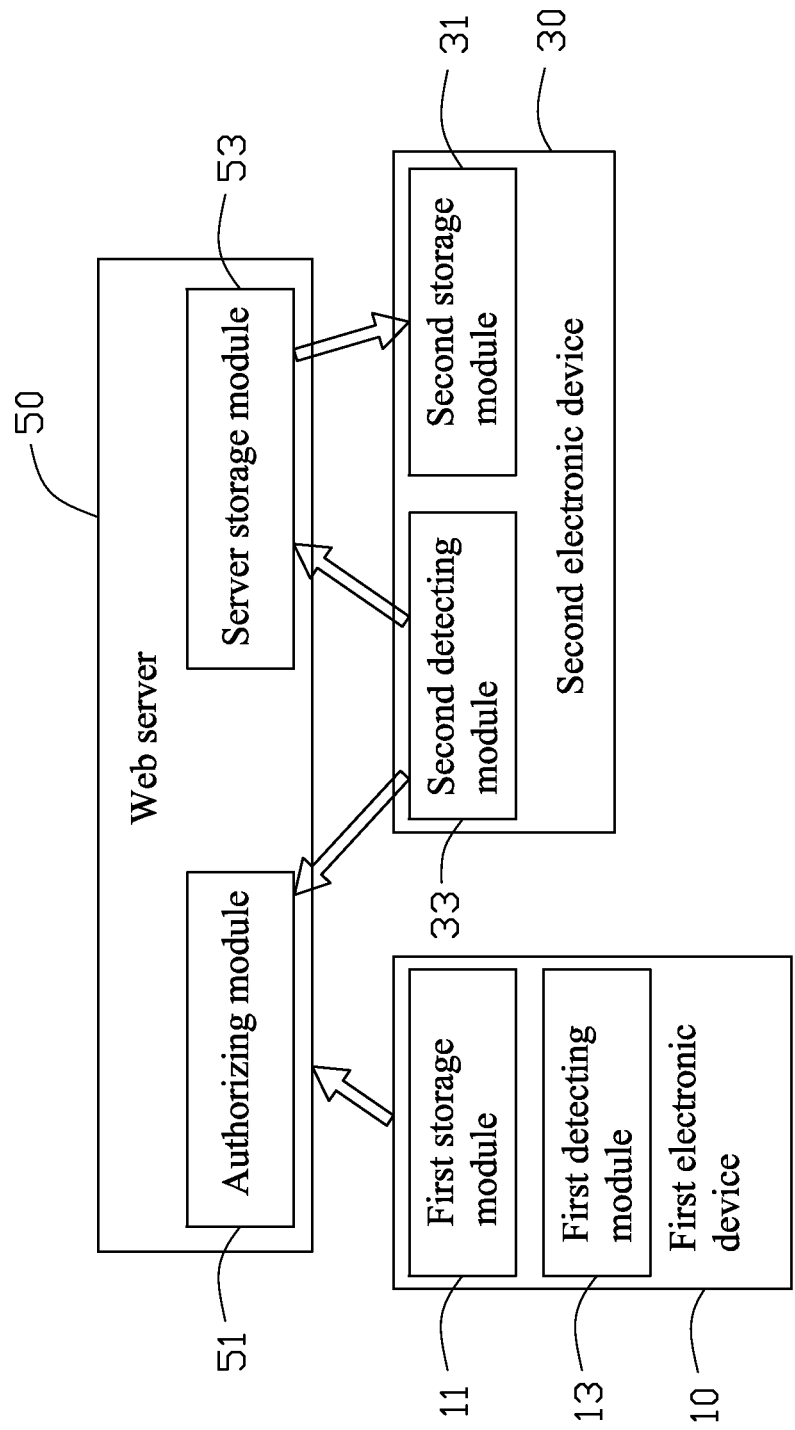
FIG. 2 is a similar to FIG. 1, but showing a work flow of the file sharing system.
Figure 3:
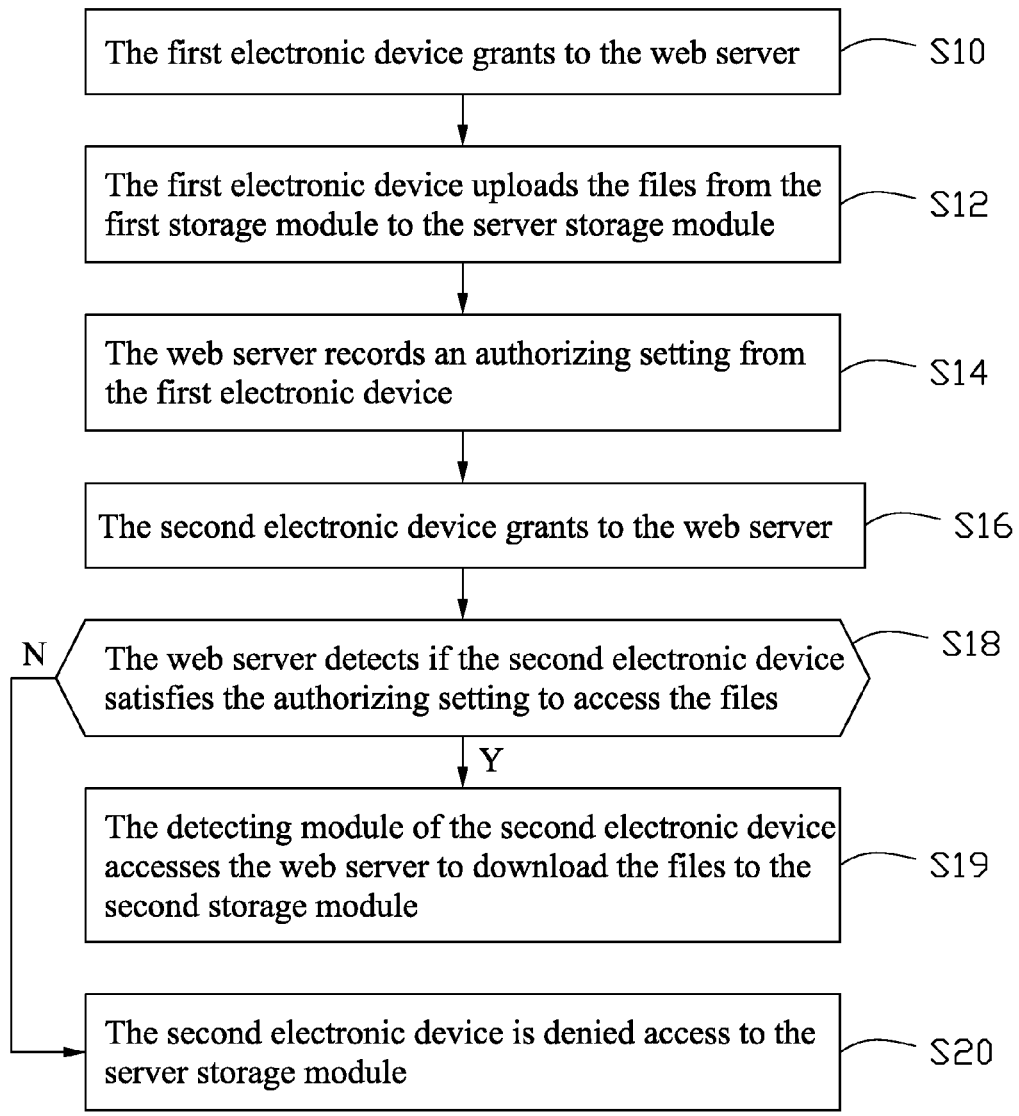
FIG. 3 is a flowchart of an embodiment of a file sharing method.

Referring to FIG. 2 and FIG. 3, a flowchart of a file sharing method illustrates the following steps.

In step S10, the first electronic device 10 grants access to the web server 50. The authorizing module 51 of the web server 50 recognizes the first electronic device 10 according to the static IP address of the first electronic device 10.

In step S12, the first electronic device 10 uploads the files from the first storage module 11 to the server storage module 53.

In step S14, the web server 50 records an authorizing setting from the first electronic device 10. The first electronic device 10 stores a name and the IP address of the second electronic device 30 in a contact list. In this step, the web server 10 records the IP address of the second electronic device 30 from the contract list.

In step S16, the second electronic device 30 grants access to the web server 50.

In step S18, the web server 50 detects if the second electronic device 30 satisfies the authorizing setting to access the files. If yes, go to S19, if no, go to S20.

In step S19, the second detecting module 33 of the second electronic device 30 accesses to the web server 50 to download the files to the second storage module 31. When the files are downloaded from the web server 50, the web server 50 is capable of sending an access record to the first electronic device 10.

In step S20, the second electronic device 30 is denied access to the server storage module 53.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A file sharing method in a web server, comprising:
    allowing access to by a first electronic device;
    downloading a plurality of files from the first electronic device;
    recording an authorizing setting from the first electronic device through recording an IP address of the second electronic device from a contact list in the first electronic device;
    granting access to the web server by a second electronic device; and
    detecting if the second electronic device satisfies the authorizing setting to access the files,
    wherein the second electronic device comprises a detecting module; and when the second electronic device satisfies the authorizing setting, the detecting module is capable of accessing the web server to download the files, when the files are downloaded from the web server, and the web server is capable of sending an access record to the first electronic device.

2. A file sharing system, comprising:
    a web server comprising an authorizing module and a server storage module;
    wherein the server storage module is capable of storing files uploaded from a first electronic device, the authorizing module is capable of recording an authorizing setting from the first electronic device through recording an IP address of the second electronic device from a contact list in the first electronic device to authorize the second electronic device to access the files in the server storage module, the second electronic device has a detecting module, the authorizing module is capable of authorizing the detecting module to download the files from the server storage module, when the files are downloaded from the web server by the second electronic device, the web server is capable of sending an access record to the first electronic device.

* * * * *